United States Patent
Ding et al.

(10) Patent No.: US 12,129,376 B2
(45) Date of Patent: Oct. 29, 2024

(54) ANTIBACTERIAL POLYCARBONATE COMPOSITE AND PREPARATION METHOD THEREOF

(71) Applicant: KINGFA SCI. & TECH. CO., LTD., Guangdong (CN)

(72) Inventors: Chao Ding, Guangdong (CN); Mingkun Li, Guangdong (CN); Yin Cen, Guangdong (CN); Minle Peng, Guangdong (CN); Junwei Ai, Guangdong (CN); Jun Wu, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 986 days.

(21) Appl. No.: 17/050,833

(22) PCT Filed: Oct. 30, 2019

(86) PCT No.: PCT/CN2019/114374
§ 371 (c)(1),
(2) Date: Oct. 26, 2020

(87) PCT Pub. No.: WO2020/103658
PCT Pub. Date: May 28, 2020

(65) Prior Publication Data
US 2021/0054194 A1 Feb. 25, 2021

(30) Foreign Application Priority Data
Nov. 21, 2018 (CN) .......................... 201811393226.7

(51) Int. Cl.
C08L 69/00 (2006.01)
C08J 3/20 (2006.01)
C08K 3/015 (2018.01)

(52) U.S. Cl.
CPC .............. *C08L 69/00* (2013.01); *C08J 3/203* (2013.01); *C08J 2369/00* (2013.01); *C08J 2483/04* (2013.01)

(58) Field of Classification Search
CPC ................................ C08L 69/00; C08K 3/015
See application file for complete search history.

(56) References Cited

U.S. PATENT DOCUMENTS 5,274,017 A * 12/1993 Pan .................... C08K 9/02
524/436
8,501,848 B2 * 8/2013 Im ..................... C08K 5/42
524/165

FOREIGN PATENT DOCUMENTS

| CN | 101405132 | | 4/2009 |
|---|---|---|---|
| CN | 105524444 | | 4/2016 |
| CN | 106987082 | | 7/2017 |
| CN | 107353615 | | 11/2017 |
| CN | 107619590 | | 1/2018 |
| CN | 109486153 | | 3/2019 |
| CN | 109553949 | | 4/2019 |
| CN | 109749391 | | 5/2019 |
| JP | 10140012 | A * | 5/1998 |
| JP | 10231429 | A * | 9/1998 |
| KR | 704316 | B1 * | 4/2007 |
| WO | 2008007908 | | 1/2008 |
| WO | 2017109114 | | 6/2017 |

OTHER PUBLICATIONS

Machine translation of CN 109486153 A, published Mar. 19, 2019 < retrieved from https://worldwide.espacenet.com on Oct. 19, 2023 >.*
"International Search Report (Form PCT/ISA/210) of PCT/CN2019/114374", mailed on Jan. 15, 2020, with English translation thereof, pp. 1-6.

* cited by examiner

*Primary Examiner* — Vickey Nerangis
(74) *Attorney, Agent, or Firm* — JCIPRNET

(57) ABSTRACT

An antibacterial polycarbonate composite includes the following components in parts by weight: 100 parts of a polycarbonate, 0.01-5 parts of a nanometer metal oxide, and 0.01-5 parts of a silicon-containing high-molecular polymer; and based on a total weight of the antibacterial polycarbonate composite, a content of a silver ion is 100-1200 ppm.

10 Claims, No Drawings

ANTIBACTERIAL POLYCARBONATE COMPOSITE AND PREPARATION METHOD THEREOF

CROSS-REFERENCE TO RELATED APPLICATION

This application is a 371 of international application of PCT application serial no. PCT/CN2019/114374, filed on Oct. 30, 2019, which claims the priority benefit of China application no. 201811393226.7, filed on Nov. 21, 2018. The entirety of each of the above mentioned patent applications is hereby incorporated by reference herein and made a part of this specification.

TECHNICAL FIELD

The present invention relates to the technical field of polymer composites, and particularly relates to an antibacterial polycarbonate composite and a preparation method thereof.

BACKGROUND

At present, polycarbonate (PC) is widely used in production of a variety of industrial and civil parts (such as a variety of transparent parts, lampshades, and instrument panels, etc.). With an improvement of living standards, people are paying more and more attention to health. In order to avoid bacterial reproduction in parts made of plastics and improve safety of products, requirements for plastics to inhibit the bacterial reproduction are becoming more and more stringent.

At present, antibacterial agents which are widely used in modified plastics are metal ion antibacterial agents. Because of their instability, these metal ions are easy to be oxidized in processing and even in use, not only causing loss of a bactericidal function but also darkening the color of materials. Especially in engineering plastics, such as polycarbonate resin, a processing temperature is often higher than 300° C., so it is greatly difficult to make the antibacterial agent stable and maintain an effect in a relatively high-temperature processing technology. In the prior art, an appearance can be modified by increasing an amount of color powder, but increasing the amount of the color powder will greatly increase a cost of the material and directly affect a heat-resistance performance of the polycarbonate material. A yellowing-resistant nanometer silver antibacterial polycarbonate material is disclosed in Chinese patent 201610555237.5, which uses a metal ion passivator to prevent the material from yellowing at high temperature in the processing, but does not take dispersion problem of silver ions in the material into account.

At the same time, the melt polycarbonate has a high viscosity in the processing, and the polycarbonate material is a temperature-sensitive material rather than a shear-sensitive material, so a filling-type metal ion antibacterial agent is easy to aggregate. In the case of less added amount and obvious gradient concentration difference in a matrix, how to ensure that the antibacterial agent provides a bactericidal effect when dispersed on a surface of the whole material becomes an urgent technical problem to be solved. Moreover, in the prior art, the silver ion antibacterial agent is only enriched on the material surface or uniformly dispersed in the material. As for the former, it is easy to lose an antibacterial effect because of attrition of the material surface; as for the latter, the silver ion antibacterial agent which is distributed on the surface is very few because the silver ion antibacterial agent is uniformly distributed in the material, so the antibacterial effect is not good. A solution is generally to increase an amount of the silver ion antibacterial agent, thereby increasing the cost. On the other hand, after the silver ion antibacterial agent on the material surface is attrited, the silver ion antibacterial agent present inside the material cannot migrate to the surface, so a durability of the material is poor.

SUMMARY

A purpose of the present invention is to provide an antibacterial polycarbonate composite, which has advantages of a good appearance, a good color stability, a good antibacterial performance, a gradually increasing concentration of silver ions from inside to outside in the material and a well sustained antibacterial effect which can be maintained since the silver ions inside the material will migrate slowly with attrition of the material surface.

Another purpose of the present invention is to provide a preparation method of the antibacterial polycarbonate composite.

The present invention is realized through the following technical solutions:

An antibacterial polycarbonate composite, includes the following components in parts by weight:

| | |
|---|---|
| polycarbonate | 100 parts |
| nanometer metal oxide | 0.01-5 parts |
| silicon-containing high-molecular polymer | 0.01-5 parts | based on a total weight of the antibacterial polycarbonate composite, a content of a silver ion is 100-1200 ppm.

Preferably, the antibacterial polycarbonate composite includes the following components in parts by weight:

| | |
|---|---|
| polycarbonate | 100 parts |
| nanometer metal oxide | 0.05-2.5 parts |
| silicon-containing high-molecular polymer | 0.1-2.5 parts | based on the total weight of the antibacterial polycarbonate composite, the content of the silver ion is 100-1200 ppm.

Polycarbonate resin: the polycarbonate resin of the present invention can be a branched thermoplastic polymer or copolymer obtained by a reaction of dihydroxyl compounds or the dihydroxyl compounds and a small amount of polyhydroxyl compounds with phosgene or dicarbonate. A production method of the polycarbonate resin is not particularly limited, and the polycarbonate resin produced by a phosgene method (an interfacial polymerization method) or a melting method (a trans-esterification method) as known so far can be used. An aromatic dihydroxyl compound is preferably selected as a raw material dihydroxyl compound, and can be exemplified by 2,2-bis (4-hydroxyphenyl) propane (=bisphenol A), tetramethyl bisphenol A, bis (4-hydroxyphenyl)-p-diisopropyl benzene, hydroquinone, resorcinol, 4,4-dihydroxydiphenyl, etc., among which bisphenol A is preferred. A compound in which at least one tetraalkyl phosphonium sulfonate is bonded to the aforementioned aromatic dihydroxyl compound can also be used.

In the aforementioned, the polycarbonate resin is preferably the aromatic polycarbonate resin derived from 2,2-bis (4-hydroxyphenyl) propane, or an aromatic polycarbonate copolymer derived from 2,2-bis (4-hydroxyphenyl) propane and other aromatic dihydroxyl compounds. The polycarbonate resin may also be a copolymer with the aromatic polycarbonate resin as a main composition, for example, a copolymer with a polymer or oligomer containing a siloxane structure. In addition, a mixture of two or more of the above-mentioned polycarbonate resins can be used. A mono aromatic hydroxyl compound can be used to adjust a molecular weight of the polycarbonate resin, such as m-methyl phenol, p-methyl phenol, m-propyl phenol, p-propyl phenol, p-tert-butyl phenol and p-(long-chain alkyl)-substituted phenols.

The present invention has no particular limitation on the production method of the polycarbonate resin, and the polycarbonate resin produced by the phosgene method (the interfacial polymerization method) or the melting method (the trans-esterification method) can be used. The polycarbonate resin can also be provided by subjecting the polycarbonate resin produced by the melting method to a post-treatment for adjusting an amount of terminal hydroxyl groups.

The silver ion is derived from the silver ion antibacterial agent.

The nanometer metal oxide is at least one selected from the group of zinc oxide, magnesium oxide, calcium oxide, copper oxide, titanium dioxide, silica, alumina, zirconia, cerium oxide and iron oxide, and a particle size (D50) of the nanometer metal oxide is 200 nm to 800 nm; preferably, the nanometer metal oxide is at least one selected from the group of zinc oxide, magnesium oxide, calcium oxide and copper oxide with the particle size (D50) of 200 nm to 800 nm; and more preferably, the nanometer metal oxide is selected from zinc oxide, with the particle size (D50) of 200 nm to 800 nm.

The silicon-containing high-molecular polymer is at least one selected from siloxane polymers.

A molecular weight of the siloxane polymer is 150,000-350,000; and preferably, the molecular weight of the siloxane polymer is 200,000-300,000.

The antibacterial polycarbonate composite further includes 0-2 parts of a color powder in parts by weight.

The antibacterial polycarbonate composite further includes 0-5 parts of at least one of an antioxidant, a lubricant, a weather resistant agent and a release agent in parts by weight. The role of the antioxidant is to prevent the material from oxidation at high temperature during extrusion and granulation.

A commonly used white color powder includes titanium oxide.

The present invention has no particular limitation on the production method, a crystallization morphology, an average particle size and the like of titanium oxide.

The preparation method of the antibacterial polycarbonate composite includes the following steps: the polycarbonate, the nanometer metal oxide, the silicon-containing high-molecular polymer and the silver ion antibacterial agent are mixed evenly in a high-speed mixing machine according to a ratio, then added to a twin-screw extruder, melted and mixed at a temperature of 240° C.-260° C., and then granulated, cooled and dried, to obtain the antibacterial polycarbonate composite.

In a general silver ion antibacterial polycarbonate, a conventional addition of a flame retardant will affect physical performances of a resin matrix, and also have a negative impact on an activity of the antibacterial agent. Because the flame retardant will promote an invalidation of the silver ions in a process of high temperature and shear, it will bring an unexpected effect to the composition. The antibacterial polycarbonate composite of the present invention is added with a silicon-containing high-molecular polymer, which can achieve a good compatibility with the polycarbonate matrix resin. At the same time, because of the existence of polydimethyl siloxane, as silicon is an effective component in a flame retardant system, its surface energy characteristics can not only ensure a sufficiently stable flame retardancy, but also improve dispersion and surface performances.

The present invention has the following beneficial effects:

The present invention provides an antibacterial polycarbonate composite. By adding the silver ion antibacterial agent and the nanometer oxide, and then synergizing a dispersion and migration effect of the silicon-containing polymer, it enables the silver ion antibacterial agent to achieve distribution with a gradient increasing concentration from inside of the material to the surface. When the silver ion antibacterial agent on the material surface is attrited, the silver ions inside the material will migrate to the surface at an even rate along with the silicon-containing polymer to achieve a long-lasting antibacterial effect, which can reduce an added amount of the silver ions. In addition, the silicon-containing polymer has a color-shading effect, and even if the silver ions are reduced to elementary silver, it will not appear grey. Thus, a beautiful white color can be obtained with a small amount of the white color powder. In summary, the antibacterial polycarbonate composite of the present invention has advantages of good and long-lasting antibacterial effect, good appearance, and stable color, etc.

DETAILED DESCRIPTION

The present invention is further illustrated by the following embodiments, but the present invention is not limited by the following embodiments.

Sources of raw materials used in the present invention are as follows, but are not limited by the following raw materials.

Silver ion source: a silver ion antibacterial agent, IKM50G, Zeomic, Japan;
Zinc oxide A: Mitsubishi, Japan, D50=400 nm;
Zinc oxide B: D50=5 micron;
Calcium oxide: Merck, Germany, D50=400 nm;
Siloxane polymer A: molecular weight 200,000;
Siloxane polymer B: molecular weight 300,000;
Siloxane polymer C: molecular weight 150,000;
Siloxane polymer D: molecular weight 350,000;
Siloxane polymer E: molecular weight 100,000;
Siloxane polymer F: molecular weight 500,000;
Lubricant: POLY TS 30A, Korea Pacific Chemical;
Antioxidant: 2112, Adeka;
Color powder: titanium dioxide 2223, Kronos, Germany;
Preparation method of Embodiments and Comparative Examples: a polycarbonate, a nanometer metal oxide, a silicon-containing high-molecular polymer and a silver ion antibacterial agent were mixed evenly in a high-speed mixing machine according to a ratio, then added to a twin-screw extruder, melted and mixed at a temperature of 240° C.-260° C., and then granulated, cooled and dried, to obtain an antibacterial polycarbonate composite.

Test methods for each performance:
(1) Antibacterial effect: GB 21551.2-2010 (film sticking method). Experimental strains are ATCC 6538P and AS 1.90.
(2) Antibacterial persistence: determination of Ag particle content on an ICP surface.

(3) Color stability: composition was injection-molded at 300° C.-330° C. into a 2.0 mm standard color plate, L value, a value and b value of the color plate of the composition were compared with those of a color standard sample without adding the silver ion antibacterial agent, and color phase was observed; L means black and white, or light and dark, + means kind of white, − means kind of dark; a means red and green, + means kind of red, − means kind of green; b means yellow and blue, + means kind of yellow, − means kind of blue; mere L, a, b are absolute values, and these three values can be used to accurately represent a color point in a three-dimensional stereogram. Correction can be made through a difference of a relative value with a reference point, and a total color difference can be calculated by a formula $\Delta E=[(\Delta L)^2+(\Delta a)^2+(\Delta b)^2]^{1/2}$. The larger $\Delta E$ is, the greater a color change is and the poorer the color stability is.

(4) Silver ion distribution: a plate with a thickness of 2.0 mm was prepared, after liquid nitrogen quenching, silver element distribution in a cross section was measured by EDX, wherein grade 1 represents an obvious gradient distribution, meaning an excellent migration to ensure a sustained antibacterial ability; grade 2 represents a good gradient distribution, at this time, the gradient is not continuous, meaning a good migration, while probably not ensuring a consistent migration rate; grade 3 represents a general gradient distribution, at this time, the gradient appears a fault, meaning a certain degree of migration while appearing an obvious instability; grade 4 represents concentration existed on the surface only, or concentration existed in a center of the fault, without migration, and without the sustained antibacterial ability; grade 1+ is slightly better than grade 1.

(5) Thermal stability: in an injection molding machine with an injection temperature set to 300° C., after 10 minutes of thermal retention according to injection pressure and injection temperature specified in an internal standard, a sample strip was injection-molded with a tensile strength of ISO standard. A strength retention rate after the thermal retention was calculated after testing, the higher the strength retention rate is, the better the thermal stability is; and the lower the strength retention rate is, the poorer the thermal stability is.

(6) Silver ion content: An ICP standard curve extrapolation method. Determination of Ag content in the composition was carried out by an optical emission spectrum with inductively coupled plasma (ICP-OES). In order to determine a total Ag content, 2 g of the composition to be tested was weighed, treated with 5 ml of nitric acid, and stirred to dissolve, and the solution was supplemented to 100 ml. The ICP standard curve extrapolation method was carried out to calculate the total Ag content.

TABLE 1

Distribution ratios (parts by weight) of each component and test results of each performance for Embodiments

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| PC | 100 | 100 | 100 | 100 | 100 | 100 | 100 | 100 |
| Silver ion content, ppm | 400 | 400 | 400 | 400 | 400 | 400 | 400 | 400 |
| Zinc oxide A | 0.01 | 0.05 | 2 | 3 | 0.05 | 0.05 | 0.05 | 0.05 |
| Calcium oxide | — | — | — | — | — | — | — | — |
| Siloxane polymer A | 1 | 1 | 1 | 1 | 0.05 | 0.1 | 2 | 5 |
| Siloxane polymer B | — | — | — | — | — | — | — | — |
| Siloxane polymer C | — | — | — | — | — | — | — | — |
| Siloxane polymer D | — | — | — | — | — | — | — | — |
| Lubricant | 0.3 | 0.3 | 0.3 | 0.3 | 0.3 | 0.3 | 0.3 | 0.3 |
| Antioxidant | 0.1 | 0.1 | 0.1 | 0.1 | 0.1 | 0.1 | 0.1 | 0.1 |
| Color powder | 0.4 | 0.4 | 0.4 | 0.4 | 0.4 | 0.4 | 0.4 | 0.4 |
| Antibacterial effect ATCC 6538P | 99.3 | 99.9 | 99.9 | 99.9 | 97.2 | 99.9 | 99.9 | 96.9 |
| Antibacterial effect AS 1.90 | 98.6 | 99.9 | 99.9 | 99.9 | 96.3 | 99.9 | 99.9 | 97.6 |
| Silver ion distribution | Grade 3 | Grade 1 | Grade 1+ | Grade 2 | Grade 3 | Grade 2 | Grade 2 | Grade 3 |
| Color stability L | 94.2 | 93.20 | 93.70 | 92.70 | 92.30 | 93.09 | 92.78 | 93.35 |
| a | −0.23 | −0.48 | −0.46 | −0.45 | −0.38 | −0.56 | −0.59 | −0.46 |
| b | 2.98 | 2.05 | 2.00 | 1.99 | 3.05 | 2.03 | 2.06 | 2.10 |
| $\Delta E$ | 0.983 | 0.047 | 0.206 | 0.478 | 1.003 | 0.797 | 0.682 | 1.401 |
| Thermal stability, % | 88.9 | 90.4 | 91.5 | 90.1 | 86.7 | 89.8 | 89.5 | 88.3 |

| | Embodiment 9 | Embodiment 10 | Embodiment 11 | Embodiment 12 | Embodiment 13 | Embodiment 14 |
|---|---|---|---|---|---|---|
| PC | 100 | 100 | 100 | 100 | 100 | 100 |
| Silver ion content, ppm | 100 | 1200 | 400 | 400 | 400 | 400 |
| Zinc oxide A | 0.05 | 0.05 | 0.05 | 0.05 | 0.05 | — |
| Calcium oxide | — | — | — | — | — | 0.05 |

TABLE 1-continued

Distribution ratios (parts by weight) of each component and test results of each performance for Embodiments

| | | | | | | | |
|---|---|---|---|---|---|---|---|
| Siloxane polymer A | | 1 | 1 | — | — | — | 1 |
| Siloxane polymer B | | — | — | 1 | — | — | — |
| Siloxane polymer C | | — | — | — | 1 | — | — |
| Siloxane polymer D | | — | — | — | — | 1 | — |
| Lubricant | | 0.3 | 0.3 | 0.3 | 0.3 | 0.3 | 0.3 |
| Antioxidant | | 0.1 | 0.1 | 0.1 | 0.1 | 0.1 | 0.1 |
| Color powder | | 0.4 | 0.4 | 0.4 | 0.4 | 0.4 | 0.4 |
| Antibacterial effect ATCC 6538P | | 95.7 | 99.9 | 99.9 | 99.9 | 99.9 | 98.9 |
| Antibacterial effect AS 1.90 | | 93.2 | 99.9 | 99.9 | 99.9 | 99.9 | 98.9 |
| Silver ion distribution | | Grade 1 | Grade 1 | Grade 1 | Grade 2 | Grade 2 | Grade 1 |
| Color stability | L | 93.70 | 89.7 | 93.4 | 92.7 | 93.8 | 93.8 |
| | a | −0.33 | −0.42 | −0.48 | −0.33 | −0.42 | −0.25 |
| | b | 2.00 | 3.76 | 2.07 | 3.01 | 1.99 | 3.10 |
| | ΔE | 0.032 | 1.481 | 0.079 | 1.317 | 1.215 | 1.003 |
| Thermal stability, % | | 91.0 | 86.7 | 90.3 | 85.46 | 88.4 | 89.1 |

It can be seen from Embodiment 1 to Embodiment 4 that when an amount of nanometer zinc oxide is in a range of 0.05-2.5 parts, each performance is relatively good.

It can be seen from Embodiment 2 or Embodiment 5 to Embodiment 8 that when an amount of siloxane polymer with a molecular weight of 200,000-300,000 is in a range of 0.1-2.5 parts, each performance is relatively good.

It can be seen from Embodiment 2 and Embodiment 11 to Embodiment 13 that when the molecular weight of the siloxane polymers is in the range of 200,000-300,000, each performance is better compared with the siloxane polymers with a molecular weight of 150,000 and 350,000.

It can be seen from Embodiment 2 and Embodiment 14 that a dispersion effect of the nanometer zinc oxide is relatively good.

TABLE 2

Distribution ratios (parts by weight) of each component and test results of each performance for Comparative Examples

| | | Comparative Example 1 | Comparative Example 2 | Comparative Example 3 | Comparative Example 4 | Comparative Example 5 |
|---|---|---|---|---|---|---|
| PC | | 100 | 100 | 100 | 100 | 100 |
| Silver ion content, ppm | | 400 | 400 | 400 | 400 | 400 |
| Zinc oxide A | | — | 0.05 | — | 0.05 | 0.05 |
| Zinc oxide B | | — | — | 0.05 | — | — |
| Siloxane polymer A | | 1 | — | 1 | — | — |
| Siloxane polymer E | | — | — | — | 1 | — |
| Siloxane polymer F | | — | — | — | — | 1 |
| Lubricant | | 0.3 | 0.3 | 0.3 | 0.3 | 0.3 |
| Antioxidant | | 0.1 | 0.1 | 0.1 | 0.1 | 0.1 |
| Color powder | | 0.4 | 0.4 | 0.4 | 0.4 | 0.4 |
| Antibacterial effect ATCC 6538P | | <90 | <90 | <90 | <90 | <90 |
| Antibacterial effect AS 1.90 | | <90 | <90 | <90 | <90 | <90 |
| Silver ion distribution | | Grade 4 | Grade 4 | Grade 4 | Grade 4 | Grade 4 |
| Color stability | L | — | 90.20 | 88.9 | 91.7 | 93.9 |
| | a | — | −0.58 | −0.33 | −0.43 | −0.35 |
| | b | — | 3.05 | 3.18 | 3.01 | 2.10 |
| | ΔE | 6.09 | 2.037 | 5.732 | 1.46 | 1.07 |
| Thermal stability, % | | 21.7 | 34.5 | 23.6 | 71.2 | 78.3 |

It can be seen from Embodiment 1 and Comparative Example 1 that the distribution of silver ions, the color stability and the thermal stability can be obviously improved by only adding 0.01 parts of nanometer zinc oxide.

It can be seen from Embodiment 2 and Comparative Example 2 that when the siloxane polymers with the molecular weight of 200,000-300,000 are not added, each performance is relatively poor.

It can be seen from Embodiment 2 and Comparative Example 3 that when the particle size of zinc oxide is larger than nanometer scale (200-800 nm), there is no synergistic dispersion effect, and the performance of the PC itself is reduced due to a weak alkalinity of the zinc oxide, resulting that each performance of the product is poor.

It can be seen from Comparative Example 4 or Comparative Example 5 that when the molecular weight of the siloxane polymer is 100,000, each performance is relatively poor; when the molecular weight of the siloxane polymer is 500,000, although the color stability is good and the product is relatively white, its thermal stability is poor, especially the silver ion distribution is poor, which can not meet requirements of a long-term sustained antibacterial effect of the present invention.

What is claimed is:

1. An antibacterial polycarbonate composite, comprising the following components:
    100 parts of polycarbonate in parts by weight;
    0.01-5 parts of nanometer metal oxide in parts by weight;
    0.01-5 parts of silicon-containing high-molecular polymer in parts by weight; and
    100-1200 ppm of a silver ion, based on a total weight of the antibacterial polycarbonate composite,
    wherein the nanometer metal oxide is calcium oxide and a particle size D50 of the calcium oxide is 200 nm to 800 nm,
    the silicon-containing high-molecular polymer is at least one selected from siloxane polymers, and
    a molecular weight of the siloxane polymers is 200,000-300,000.

2. The antibacterial polycarbonate composite according to claim 1, comprising the following components:
    100 parts of the polycarbonate in parts by weight;
    0.05-2.5 parts of the nanometer metal oxide in parts by weight;
    0.1-2.5 parts of the silicon-containing high-molecular polymer in parts by weight; and
    100-1200 ppm of the silver ion, based on a total weight of the antibacterial polycarbonate composite.

3. The antibacterial polycarbonate composite according to claim 2, wherein the silver ion is derived from a silver ion antibacterial agent.

4. The antibacterial polycarbonate composite according to claim 2, wherein the antibacterial polycarbonate composite further comprises 0-2 parts of a color powder in parts by weight.

5. The antibacterial polycarbonate composite according to claim 2, wherein the antibacterial polycarbonate composite further comprises 0-5 parts of at least one of an antioxidant, a lubricant, a weather resistant agent and a release agent in parts by weight.

6. The antibacterial polycarbonate composite according to claim 1, wherein the silver ion is derived from a silver ion antibacterial agent.

7. The antibacterial polycarbonate composite according to claim 1, wherein the antibacterial polycarbonate composite further comprises 0-2 parts of a color powder in parts by weight.

8. The antibacterial polycarbonate composite according to claim 1, wherein the antibacterial polycarbonate composite further comprises 0-5 parts of at least one of an antioxidant, a lubricant, a weather resistant agent and a release agent in parts by weight.

9. A preparation method of the antibacterial polycarbonate composite according to claim 6, comprising the following steps:
    the polycarbonate, the nanometer metal oxide, the silicon-containing high-molecular polymer and the silver ion antibacterial agent are mixed evenly in a high-speed mixing machine according to a ratio, then added to a twin-screw extruder, melted and mixed at a temperature of 240° C.-260° C., and then granulated, cooled and dried, to obtain the antibacterial polycarbonate composite.

10. A preparation method of the antibacterial polycarbonate composite according to claim 3, comprising the following steps:
    the polycarbonate, the nanometer metal oxide, the silicon-containing high-molecular polymer and the silver ion antibacterial agent are mixed evenly in a high-speed mixing machine according to a ratio, then added to a twin-screw extruder, melted and mixed at a temperature of 240° C.-260° C., and then granulated, cooled and dried, to obtain the antibacterial polycarbonate composite.

* * * * *